April 26, 1949.  C. W. GALEN  2,468,438
DRAFT OR TOW BAR
Filed July 22, 1946  3 Sheets-Sheet 1
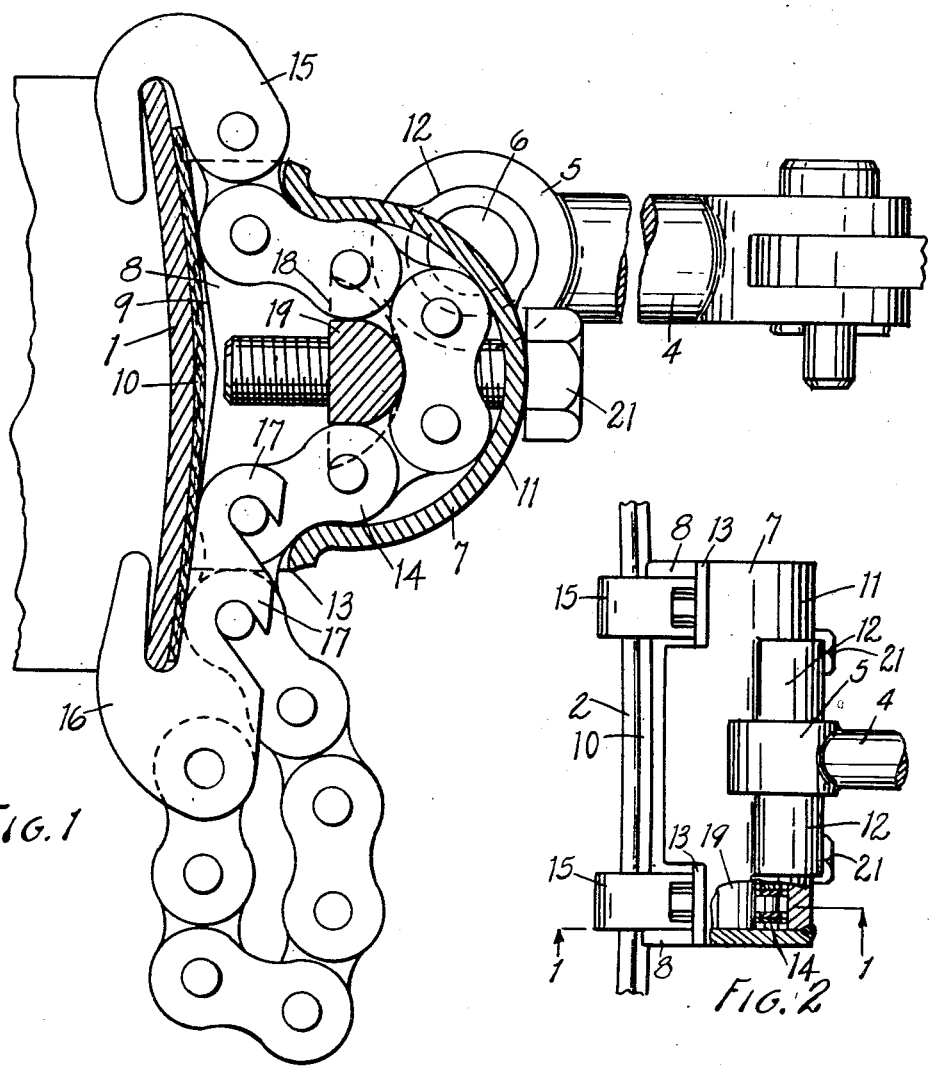
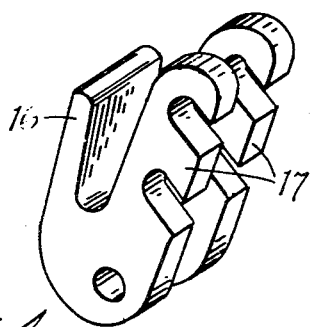
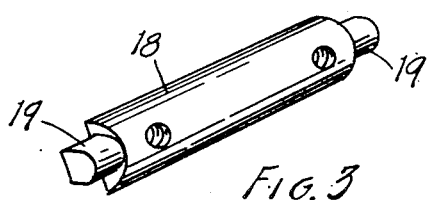
INVENTOR.
Clarence W. Galen
BY
Otis A. Earl
Attorney.

April 26, 1949.  C. W. GALEN  2,468,438
DRAFT OR TOW BAR
Filed July 22, 1946  3 Sheets-Sheet 2
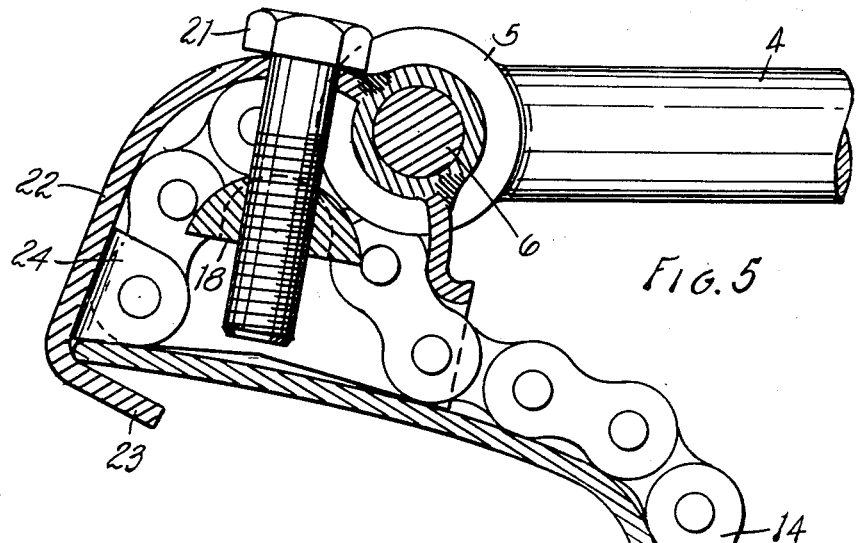
Fig.5
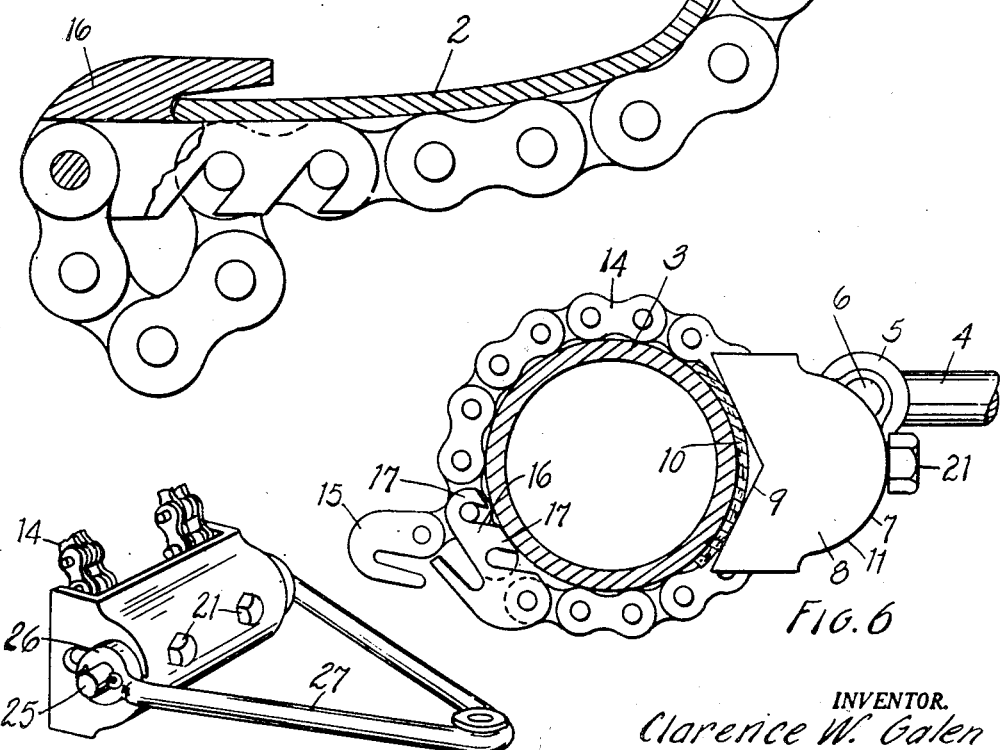
Fig.6
Fig.7
INVENTOR.
Clarence W. Galen
BY
Otis A. Earl
Attorney

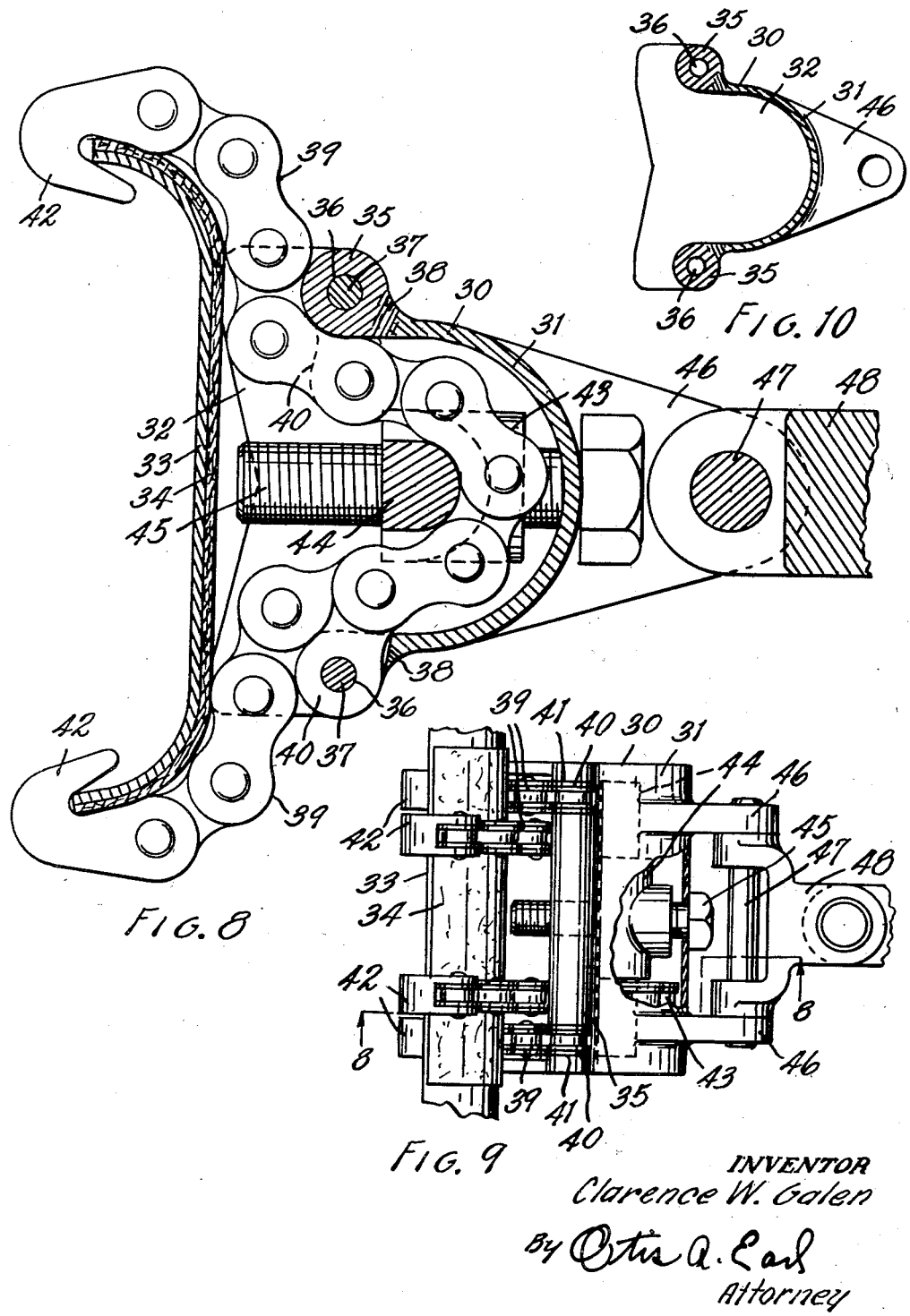

Patented Apr. 26, 1949

2,468,438

UNITED STATES PATENT OFFICE 2,468,438

DRAFT OR TOW BAR

Clarence W. Galen, Battle Creek, Mich., assignor, by mesne assignments, to Pilot Distributing Company, Battle Creek, Mich., a corporation of Michigan Application July 22, 1946, Serial No. 685,483

8 Claims. (Cl. 280—33.44)

1

This invention relates to improvements in draft or tow bars.

The main objects of this invention are:

First, to provide a draft or tow bar that may be effectively coupled to various sizes and designs of bumpers or the like.

Second, to provide a draft or tow bar hitch which is very secure and one in which the load upon the parts is well distributed and both on the object to which the coupling is attached and on the parts of the coupling.

Third, to provide a structure of this character which may be easily attached and detached, at the same time when attached is very secure.

Objects relating to details and economies of the invention will appear from the description to follow. The invention is defined and pointed out in the claims.

Preferred embodiments of the invention are illustrated in the accompanying drawings, in which:

Fig. 1 is a fragmentary view partially in section on line 1—1 of Fig. 2 of a preferred embodiment of the invention mounted upon or attached to a bumper.

Fig. 2 is a fragmentary plan view of the structure shown in Fig. 1.

Fig. 3 is a perspective view of the clamping bar or bar-like clamp member.

Fig. 4 is a perspective view of one of the hooks of the coupling chains.

Fig. 5 is an enlarged fragmentary view of a modified form or embodiment of the invention.

Fig. 6 is a fragmentary view partially in section showing the application or adaptation of the structure to a round type of bumper.

Fig. 7 is a perspective view of a further modification or adaptation of the invention to a forked type of tow or draw bar.

Fig. 8 is a fragmentary sectional view on line 8—8 of Fig. 9 of another embodiment of adaptation of the invention.

Fig. 9 is a fragmentary plan view thereof, parts being broken away to disclose structural details.

Fig. 10 is a transverse sectional view of the coupling head.

In the accompanying drawings, 1 represents a flat type of bumper slightly curved in cross section in Figs. 1 and 2; 2 in Fig. 5 represents a bumper of U-cross section, and 3 in Fig. 6 represents a round bar type of bumper. It will be appreciated that the bumpers of automobiles and other motor vehicles differ widely in shapes and sizes and one of the primary objects of the invention is to provide a coupling means which

2 is well adapted for bumpers of varying sizes and shapes.

The tow or draft bar 4 is provided with an enlargement 5 adapted to receive the draw bolt 6 carried by the coupling head 7. This coupling head 7 comprises end walls 8 having V-recesses 9 in the edges thereof adapted to engage the outer side of the bumper 1 or the pad 10 arranged thereon, the pad being used where it is desirous to prevent possible scratching or marring of the bumper.

The coupling head is provided with a transversely curved side wall 11 having boss-like enlargements 12 providing knuckles for the draw bolt 6. The inner edges 13 of the side wall portion of the coupling head are spaced from the inner edges of the end walls so that the edges of the side walls are supported in substantially spaced relation to the bumper to permit the passage of the coupling chains 14 thereunder.

The coupling chains 14 terminate in hooks 15 and 16, the hook 16 being provided with hooked lugs 17 with which selected links of the chain may be engaged, as shown in Fig. 1. The clamping bar within the coupling head is provided with reduced portions 19 which engage the chain 14 adjacent the end walls of the coupling head. After the hooks of the chains are engaged with the draw bar and the selected links of the chain engaged with the lugs 17 as shown, for example, in Fig. 1, the clamping bar is drawn up by means of the screw bolts 21 which have threaded engagement with the clamping bar, thereby applying clamping stress to the chains and clamping the coupling head securely to the bumper. The links of the chain are also drawn into clamping engagement with the inside of the wall of the coupling head so that the parts cannot slip. This provides a very secure attachment and one which cannot accidentally loosen or become detached.

In the embodiment shown in Fig. 5, the structure is the same as that described with the exception that the coupling head designated generally by the numeral 22 is provided with an inturned hook clamp flange 23 on one edge which engages the edge of the U-sectioned bumper 2. The hooks 15 are omitted from one end of the chains and the chains are attached to round ears 24 in the coupling head. It will be noted that with this shape of bumper the draft stresses would tend to slide the coupling head on the bumper and therefore the coupling head is engaged directly with the bumper.

In the adaptation shown in Fig. 6 to the round type of bumper 3, the chains are passed entirely around the bumper and the lugs 17 of the hooks 16 are engaged with selected links at the other end of the chain. It will be appreciated that the chains are shifted somewhat longitudinally from the position shown in Fig. 1.

In the embodiment shown in Fig. 7, the clamping bar lugs 25 are extended and of cylindrical shape to pivotally support the eyes 26 of the forked draw or tow bar 27.

In the embodiment of the invention shown in Figs. 8, 9 and 10, the coupling head designated generally by the numeral 30 is provided with a side wall 31 of inwardly facing channel section and end walls 32 engageable with the side of the bumper 33 or a protecting pad 34 arranged thereon. The side wall is provided with cylindrical enlargements 35 at its inner edges having bores 36 adapted to receive the pins 37. These enlargements are, in the structure illustrated, welded as indicated at 38 to the wall portion of the side wall. Coupling chains 39 are arranged in oppositely disposed pairs with the inner end links 40 thereof engaged in slots 41 provided in the enlargement 35 to receive them with the chains 37 engaging the links. The chains are provided with hooks 42 at their outer ends adapted to engage the bumper or other support to which the coupling head is attached. It will be noted that the chains of the pairs are attached to opposite edges of the side wall member at opposed points in the coupling heads so that the chains may be formed into loops 43 engaged by the clamping bar 44 which is adjusted to apply stress or tension to the chains by means of the adjusting screw 45. This arrangement permits a very substantial amount of take-up on the chains, the take-up being applied to both chains. The stresses are uniformly distributed, both on the support and on the clamping head and chains. The clamping head is provided with ears 46 adapted to receive the coupling pins 47 for the tow bar 48.

It will be understood that different types of tow bar connections may be provided on any of these embodiments of the invention.

I have not attempted to illustrate or describe adaptations or applications to other forms or designs of bumpers or parts to which the draft or tow bar is to be attached as it is believed that this disclosure will enable those skilled in the art to embody or adapt the invention as may be desired.

Having thus described my invention, what I claim as new and desire to secure by Letters Patent, is:

1. In a draft or tow bar hitch, the combination of a chambered coupling head provided with means for attachment of a draft or tow bar thereto, coupling chains for clamping said coupling head to a bumper or the like and provided with hooks at their ends adapted to engage the opposite edges of a bumper, the hooks at one end of the chains being provided with lugs with which the chains may be engaged, means for subjecting the chains to clamping stress including a clamping bar arranged to be drawn against said chains to form a loop therein, and threaded means for adjusting the clamping bar.

2. In a draft or tow bar hitch, the combination of a chambered coupling head provided with means for attachment of a draft or tow bar thereto, coupling chains for clamping said coupling head to a bumper or the like and provided with hooks at their ends adapted to engage the opposite edges of a bumper, and means for subjecting the chains to clamping stress including a clamping bar arranged to be drawn against said chains to form a loop therein, and threaded means for adjusting the clamping bar.

3. The combination with a draft or tow bar, of a coupling head provided with means for pivotally attaching the draw or tow bar thereto, said coupling head being adapted for engagement with one edge of a bumper or the like, clamping chains attached at one end within the coupling head and provided with hooks at their outer ends adapted to engage the other edge of a bumper or the like, said hooks having lugs with which links of their chains may be selectively engaged, a clamping bar within said coupling head arranged on the opposite side of said chains from the inner surface of said head, and clamping bolts rotatable in said clamping head and having threaded engagement with said clamping bar to apply clamping stress to said chains and clamp parts thereof against the coupling head.

4. In a draft or tow bar hitch, the combination of a coupling head provided with means for attachment of a draft or tow bar thereto, a coupling chain adapted for adjustable engagement with a bumper or the like and extending into said coupling head, a clamping member, arranged to bear against an intermediate portion of said chain, and a threaded adjusting member carried by said coupling head and having threaded engagement with said clamping member whereby clamping stress may be applied to the chain and the chain clamped within said coupling head.

5. In a draft or tow bar hitch, the combination of a coupling head, chains connected at their inner ends to said coupling head at spaced opposed points, said chains being provided with support engaging means at their free ends, and means for simultaneously applying clamping stress to the chains and engaging the sides of the chains between their point of attachment to the coupling head and their support engaging members.

6. The combination with a draft bar, of a coupling head to which the draft bar is connected for vertical swinging movement, means for attaching said coupling head to a bumper comprising flexible elements extending oppositely from said coupling head and connected thereto and each provided with a hook engageable with opposite edges of a bumper, and means carried by said coupling head for tensioning said flexible elements to clamp their hooks upon the opposite edges of a bumper and the coupling head against the side of the bumper.

7. The combination with a tow bar, of a flexible coupling element having hooks engageable with opposite edges of a bumper, a coupling head to which said tow bar is swingably connected adjustable longitudinally on said flexible coupling element, and means for tensioning said flexible element carried by said coupling head for clamping the hooks upon the edges of a bumper and the coupling head upon the side of the bumper in selected position relative thereto.

8. The combination with a tow bar, of a coupling head to which the tow bar is swingably connected, flexible coupling members carried by said coupling head to extend oppositely therefrom and having hooks engageable with opposite edges of a bumper, and means for tensioning at least one of said flexible coupling members to clamp the hooks on opposite edges of a bumper and the coupling head against the side of the bumper.

CLARENCE W. GALEN.

REFERENCES CITED

The following references are of record in the file of this patent:

UNITED STATES PATENTS

| Number | Name | Date |
|---|---|---|
| 1,537,249 | Manley | May 12, 1925 |
| 1,836,806 | Larsen | Dec. 15, 1931 |
| 2,338,934 | Gross | Jan. 11, 1944 |